United States Patent
Kourkouzelis et al.

(10) Patent No.: US 8,081,569 B2
(45) Date of Patent: Dec. 20, 2011

(54) DYNAMIC ADJUSTMENT OF CONNECTION SETUP REQUEST PARAMETERS

(75) Inventors: Diamantis Kourkouzelis, San Francisco, CA (US); George Apostolopoulos, Vancouver (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 341 days.

(21) Appl. No.: 12/426,637

(22) Filed: Apr. 20, 2009

(65) Prior Publication Data

US 2010/0268798 A1    Oct. 21, 2010

(51) Int. Cl.
*H04J 3/16*    (2006.01)

(52) U.S. Cl. .............. 370/230; 370/252; 370/395.2; 709/227

(58) Field of Classification Search .............. None
See application file for complete search history.

(56) References Cited

U.S. PATENT DOCUMENTS

| | | | | |
|---|---|---|---|---|
| 5,596,572 A | * | 1/1997 | Wille-Fier et al. | 370/360 |
| 6,212,164 B1 | * | 4/2001 | Murakami et al. | 370/230 |
| 6,424,622 B1 | * | 7/2002 | Fan et al. | 370/230 |
| 6,747,971 B1 | * | 6/2004 | Hughes et al. | 370/387 |
| 6,760,305 B1 | * | 7/2004 | Pasternak et al. | 370/230 |
| 6,785,228 B1 | * | 8/2004 | Vandette et al. | 370/230 |
| 7,197,564 B1 | | 3/2007 | Bhoj et al. | |
| 2003/0189947 A1 | * | 10/2003 | Beshai | 370/428 |
| 2003/0204600 A1 | * | 10/2003 | Stoner et al. | 709/227 |
| 2006/0018329 A1 | * | 1/2006 | Nielsen et al. | 370/401 |
| 2006/0222361 A1 | * | 10/2006 | Aoki | 398/51 |
| 2009/0259752 A1 | * | 10/2009 | McNutt et al. | 709/225 |
| 2010/0124933 A1 | * | 5/2010 | Chowdhury et al. | 455/453 |

* cited by examiner

*Primary Examiner* — Min Jung

(74) *Attorney, Agent, or Firm* — Blakely, Sokoloff, Taylor & Zafman LLP

(57) ABSTRACT

The number of connection setup request packets that are accepted for processing by a network element are dynamically adjusted based on the run time capacity of the network element. The number of accepted connection setup request packets that can be initiated for processing are dynamically modified based on the processor utilization and average latency of completion of processing the connection setup requests. The network element can apply a scheduling policy to those connection setup request packets to differentiate the processing treatment of different types of connection setup requests.

21 Claims, 12 Drawing Sheets

DYNAMIC ADJUSTMENT OF CONNECTION SETUP REQUEST PARAMETERS

BACKGROUND

1. Field

Embodiments of the invention relate to the field of subscriber session setup; and more specifically, to dynamically adjusting the number of connection setup request packets accepted and processed by a network element.

2. Background

Network elements establish sessions with subscribers for different protocols (e.g., point-to-point (PPP), PPP over Ethernet (PPPoE), Layer 2 Tunneling Protocol (L2TP), CLIPS (Clientless IP), DHCP (Dynamic Host Configuration Protocol), VoIP (Voice over IP), etc. Sessions are established through a handshake protocol with the subscriber. Typically, external subscribers initiate new sessions by transmitting connection setup request packets to the network element. These request packets are received by the linecards in the network element and directed to a control card for further processing. These request packets will be enqueued on the control card. Network elements typically deploy a connection setup request throttling mechanism to limit the number of requests that the linecards can direct to the control card. In the absence of any connection setup request throttling mechanisms, the queues in the control card can grow at a much faster rate than the rate they can be processed by the processor of the control card. If the network element does not respond within a certain amount of time (typically defined by the particular protocol), the requests will time out and additional connection setup request packets will be transmitted.

The control card may program hard coded connection setup request throttling parameters such as a hard coded rate value and a hard coded burst value to each of the linecards which represent the maximum rate and burst of packets a particular linecard can direct to the control card. These values may be configurable by system operators of the network element and may be different for each protocol. These values can be chosen based on average performance expected, worst case scenario, best case scenario, etc. If the worst case is assumed, the processor in the control card is typically underutilized. If the best case is assumed, the processor in the control card may not be able to process the requests at the rate they are arriving which will lead to large queues and increased latencies and can lead to a trashing condition (e.g., as the control card becomes more overloaded, the queues will grow which can cause the connection requests to timeout, causing the subscribers to retry (submit additional connection requests) which further increases the load on the control card).

If the network element processes multiple types of requests, different processes may handle the different request types with each type of request typically requiring a different amount of resources for their successful establishment. The requests also will be competing with each other for processing by the processor in the control card.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
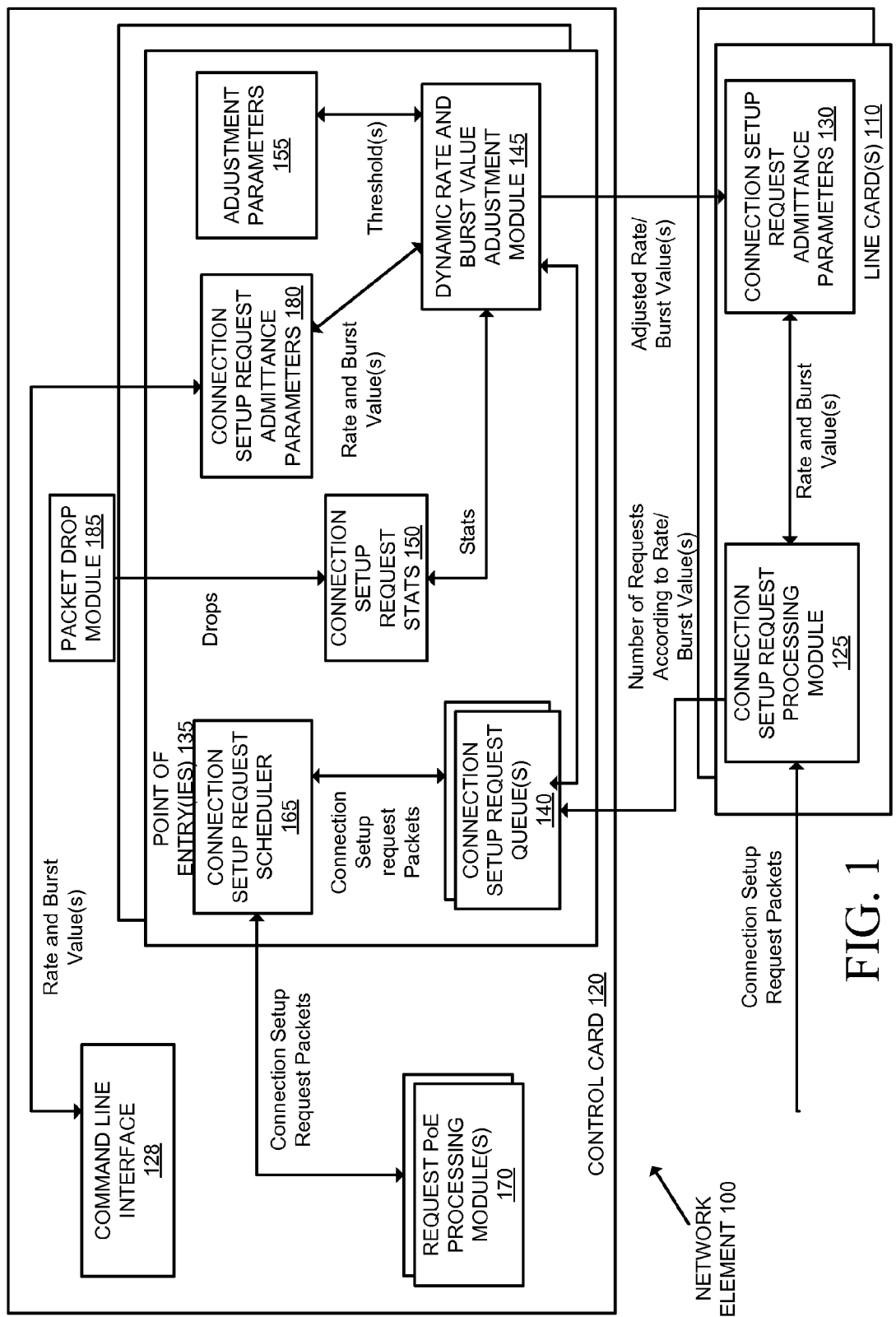
FIG. 1 illustrates an exemplary network element that dynamically adjusts the number of connection setup request packets accepted for processing according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more network elements. Such network elements store and communicate (internally and/or with other network elements and/or other computing devices such as subscriber computer end stations) over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such network elements typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given network element typically stores code and/or data for execution on the set of one or more processors of that network element. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router, virtual switch, or a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(es). Multiple contexts may be employed in a network element to provide direct network access and/or different classes of services for subscribers of service and/or content providers.

A method and apparatus for dynamically adjusting the number of connection setup request packets accepted and processed by a network element is described. In one embodiment, the number of connection setup request packets that are accepted for processing (e.g., directed from the forwarding plane to the control plane) is dynamically adjusted based on the run time capacity of the control plane. As used herein, a connection setup request packet (or sometimes referred to as a connection setup request) is a packet, typically sent from a subscriber computer end station, which initiates the establishment of a session. Connection setup requests are control packets which are directed from the forwarding plane to the control plane for further processing. The forwarding plane, which typically includes multiple linecards, directs the received packets to the control plane (e.g., a control card) at a rate programmed by the control plane. The control plane can further dynamically change the rate based on the run time capacity of the control plane. In one embodiment, the network element is capable of processing different types of connection setup requests.

In one embodiment, the control plane dynamically modifies the number of connection setup request packets that can be initiated to be processed in the control plane at a given time based on the current processor utilization and average latency of completion of processing the connection setup requests in the network element. The control plane can also schedule the connection setup request packets for processing based on the number of connection setup request packets and a scheduling policy.

FIG. 1 illustrates an exemplary network element that dynamically adjusts the number of connection setup request packets accepted for processing according to one embodiment of the invention. The network element 100 includes one or more linecards 110 and the control card 120. The control card 120 establishes sessions with subscribers (e.g., processes connection setup request packets) and maintains those sessions. For example, in the case where the network element 100 is providing support for Mobile IP, the control card 120 establishes Mobile IP sessions. Although not illustrated in FIG. 1, it should be understood that the control card 120 includes one or more processors, one or more memories, etc.

The linecard(s) 110 forward packets at a high rate and direct control packets including connection setup request packets to the control card 120 for further processing. Although not illustrated in FIG. 1, it should be understood that each of the linecard(s) 110 include one or more processors (e.g., packet processing ASICs (PPAs)), one or memories, one or more ports, etc. As illustrated in FIG. 1, the linecard(s) 110 include the connection setup request processing module 125 and the connection setup request admittance parameters 130. The connection setup request processing module 125 receives connection setup request packets from subscribers for different protocols (e.g., those protocols that the network element 100 is providing service (e.g., point-to-point (PPP), PPP over Ethernet (PPPoE), Layer 2 Tunneling Protocol (L2TP), CLIPS (Clientless IP), DHCP (Dynamic Host Configuration Protocol), VoIP (Voice over IP), Mobile IP, WiMAX, WiFi, etc.)).

The connection setup request processing module 125 processes received connection setup request packets including determining whether to direct those packets to the control card 120 for further processing. For example, the connection setup request processing module 125 parses the connection setup request packets to determine the type of connection setup request, and accesses the connection setup request admittance parameters 130 to determine the connection setup request admittance parameters for that type of connection setup request. Thus, each type of connection setup request can have different connection setup request admittance parameters. The connection setup request admittance parameters includes connection setup request rate values and connection setup request burst values. The connection setup request admittance parameters are programmed by the control card 120. In one embodiment, each of the connection setup request admittance parameters 130 includes a different connection setup request rate value and connection setup request burst value for each different protocol supported by that linecard.

In one embodiment, the initial connection setup request rate values and the connection setup request burst values are configured by system operators of the network element 100. For example, using the command line interface 128, the system operators may configure the initial connection setup request rate values and the initial connection setup request burst values for each of the linecard(s) 110 for each protocol (e.g., linecard 2, PPPoE, rate limit=100, burst=50). The connection setup request rate values indicate the maximum rate at which corresponding connection setup requests are admitted to the control card 120 for further processing. The connection setup request burst values indicate the maximum burst of packets of corresponding setup requests that can be admitted to the control card 120 for further processing (e.g., responsive to a failure (e.g., a port flap) of a linecard, many connection setup requests can be received at that linecard over a short amount of time up to the burst values). The connection setup request packets which are not directed to the control card 120 for further processing are typically dropped by the linecards. Thus, the linecard(s) 110 direct a number of connection setup requests to the control card 120 based on the connection setup request admittance parameters 130.

The control card 120 includes one or more point of entries (PoEs) 135. Each point of entry is a process (e.g., a protocol process) that receives a connection setup request after it is directed from one of the linecard(s) 110. In one embodiment, there is a separate PoE for each protocol the network element 100 is providing service for (e.g., point-to-point (PPP), PPP over Ethernet (PPPoE), Layer 2 Tunneling Protocol (L2TP), CLIPS (Clientless IP), DHCP (Dynamic Host Configuration Protocol), VoIP (Voice over IP), Mobile IP, WiMAX, WiFi, etc.). Each of the point of entries 135 is coupled with one or more request point of entries processing modules 170 (e.g., a point of entry for PPPoE is coupled with a PPPoE processing module). Each of the point of entries 135 is associated with at least one of the linecard(s) 110 (e.g., it receives connection setup request messages from at least one of the linecard(s) 110), however it should be understood that a point of entry may be associated with multiple linecards.

Each of the point of entries 135 includes one or more connection setup request queues 140. While in one embodiment each point of entry includes a connection setup request queue for each of the linecards it is associated with, in alternative embodiments each point of entry includes one or more connection setup request queues for all of the linecards it is associated with. The connection setup request queue(s) 140 are queues that include the connection setup request messages received from the linecard(s) 110 that need to be processed. The connection setup requests of the connection setup request queue(s) 140 are scheduled for processing by the connection setup request scheduler 165. As will be described in greater detail later herein, the scheduling of the connection setup request queues for processing may be optimized in embodiments of the invention.

The connection setup request scheduler 165 measures the completion rate of the different connection setup request queue(s) 140 by examining the request start and request completion. For each connection setup request queue 140, the connection setup request scheduler 165 calculates an average amount of time necessary to complete processing of a connection setup request based on the measured information. The completion rate may be used to determine the amount of latency (e.g., the time elapsed since the request was initiated for processing through completion). The completion rate is stored in the connection setup request statistics 150.

Each one of the point of entries 135 also includes a dynamic rate and burst value adjustment module 145. The dynamic rate and burst value adjustment module 145 monitors the occupancy of the connection setup request queue(s) 140. While in one embodiment the occupancy is expressed in terms of numbers (e.g., the number of connection setup requests currently stored in one of the connection setup request queue(s) 140), in alternative embodiments the occupancy is expressed in terms of time (e.g., the amount of time needed to process the connection setup requests currently stored in one of the connection setup request queue(s) 140 (given priority to the processor of the control card 120)).

While the dynamic rate and burst value adjustment module 145 has been described as monitoring the occupancy of the connection setup request queue(s) 140, in alternative embodiments a different module monitors the occupancy of the connection setup request queue(s) 140. For example, in some embodiments the connection setup request scheduler 165 monitors the occupancy of the connection setup request queue(s) 140 and determines whether the connection setup request rate limit values should be adjusted and calls the dynamic rate and burst value adjustment module 145 to perform the adjustment.

The dynamic rate and burst value adjustment module 145 dynamically adjusts the connection setup request rate value(s) and the connection setup request burst value(s) associated with that point of entry based on the occupancy of the connection setup request queue(s) 140 and based on a number of dropped packets attributable to the linecard(s) 110. For example, if the occupancy of the connection setup request queues is growing it can mean that a corresponding linecard rate is higher than the capability of the control card to process and if the occupancy of that connection setup request queue is shrinking it can mean that the corresponding linecard rate is lower than what the control card can process.

The dynamically adjusted connection setup request rate value(s) and the dynamically adjusted connection setup request burst value(s) are programmed to appropriate ones of the linecard(s) 110 (e.g., to the connection setup request admittance parameters 130) and are used by the connection setup request processing module 125 of each linecard when determining whether to direct new connection setup requests to the control card 120.

Figure 2:
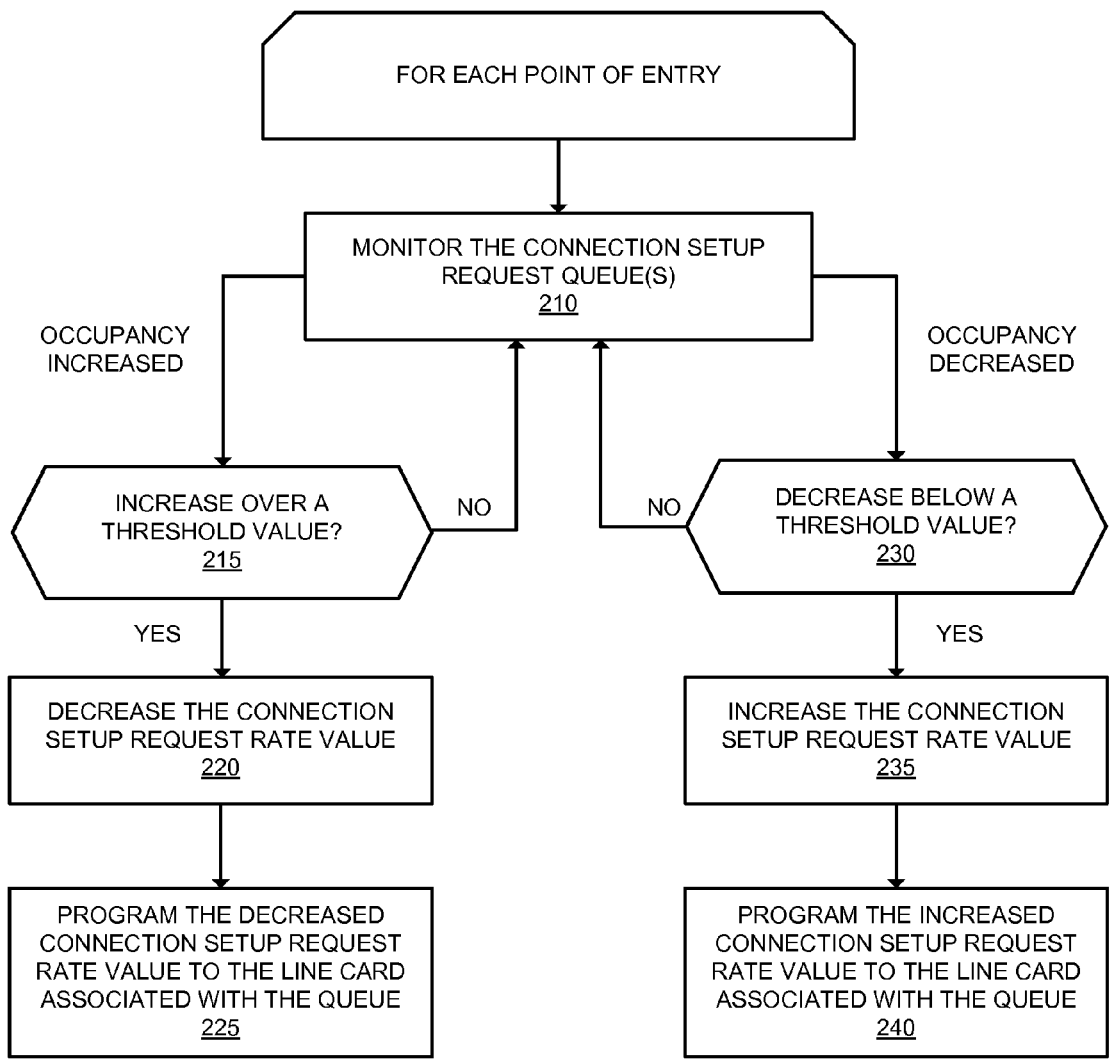
FIG. 2 is a flow diagram illustrating exemplary operations for dynamically adjusting connection setup request rate values in one embodiment of the invention.

FIG. 2 is a flow diagram illustrating exemplary operations for dynamically adjusting connection setup request rate values in one embodiment of the invention. The operations of FIG. 2 will be described with reference to the exemplary embodiment of FIG. 1. However, it should be understood that the operations of FIG. 2 can be performed by embodiments other than those discussed with reference to FIG. 1, and the embodiments discussed with reference to FIG. 1 can perform operations different than those discussed with reference to FIG. 2.

FIG. 2 will be described with reference to each point of entry having a separate queue for those linecards it receives packets from. However, embodiments of the invention are not so limited as a single point of entry may have a single queue for multiple linecards it receives packets from.

In one embodiment, each of the point of entries 135 performs the operations in FIG. 2. At block 210, the occupancy of the connection setup request queue(s) 140 are monitored. For example, with reference to FIG. 1, the dynamic rate and burst value adjustment module 145 monitors the occupancy of each of the connection setup request queue(s) 140 and populates the connection setup request statistics 150 with the completion rates (the rate that the packets have completed processing out of the connection setup request queue(s) 140). For each connection setup request queue, if the occupancy of the queue has increased, then flow moves to block 215; if the occupancy of the queue has decreased, then flow moves to block 230.

At block 215, it is determined whether the occupancy of the connection setup request queue has increased over a threshold value. Referring to FIG. 1, the dynamic rate and burst value adjustment module 145 accesses a stored threshold value in the adjustment parameters 155. In one embodiment, each connection setup request queue may have a different occupancy threshold. In one embodiment, the occupancy threshold value is equivalent to the configured connection setup request rate value for the corresponding connection setup request queue. In one embodiment, the occupancy threshold value is configurable by a system operator. If the occupancy has increased over a threshold value, then flow moves to block 220, otherwise flow moves back to block 210.

At block 220, the connection setup request rate value corresponding to the linecard associated with the connection setup request queue is decreased. Referring to FIG. 1, the dynamic rate and burst value adjustment module 145 decreases the connection setup request rate value that corresponds to the linecard associated with the connection setup request queue. The dynamic rate and burst value adjustment module 145 stores the decreased connection setup request rate value in the connection setup request admittance parameters 180. In one embodiment, the connection setup request rate value is decreased by a percentage of the current connection setup request rate value (e.g., ten percent), while in another embodiment the value is decreased an amount corresponding to the amount the occupancy is over the threshold.

Flow moves from block 220 to block 225, where the decreased connection setup request rate value is programmed to the linecard associated with the connection setup request queue. With reference to FIG. 1, the dynamic rate and burst value adjustment module 145 causes the decreased connection setup request rate value to be programmed to the connection setup request admittance parameters 130 of the one of the linecard(s) 110 associated with the connection setup request queue.

At block 230 (queue occupancy has decreased), a determination is made whether the occupancy of the connection setup request queue has decreased below a threshold value. While in one embodiment the threshold value used in block 230 is the same as the threshold value used in block 215, in an alternative embodiment the threshold values are different. With reference to FIG. 1, the dynamic rate and burst value adjustment module 145 accesses a stored threshold value in the adjustment parameters 155. In one embodiment, each connection setup request queue may have a different occupancy threshold. In one embodiment, the occupancy threshold value is equivalent to the configured connection setup request rate value for the corresponding connection setup request queue. In one embodiment, the occupancy threshold value is configurable by a system operator. If the occupancy has decreased below the threshold value, then flow moves to block 235, otherwise flow moves back to block 210.

At block 235, the connection setup request rate value corresponding to the linecard associated with the connection setup request queue is increased. Referring to FIG. 1, the dynamic rate and burst value adjustment module 145 increases the connection setup request rate value that corresponds to the linecard associated with the connection setup request queue. The dynamic rate and burst value adjustment module 145 stores the increased connection setup request rate value in the connection setup request admittance parameters 180. In one embodiment, the connection setup request rate value is increased by a percentage of the current connection setup request rate value (e.g., ten percent), while in another embodiment the value is increased an amount corresponding to the amount the occupancy is below the threshold.

Flow moves from block 235 to block 240, where the increased connection setup request rate value is programmed to the linecard associated with the connection setup request queue. With reference to FIG. 1, the dynamic rate and burst value adjustment module 145 causes the increased connection setup request rate value to be programmed to the connection setup request admittance parameters 130 of the one of the linecard(s) 110 associated with the connection setup request queue.

It should be understood that a burst of connection setup requests may cause the occupancy of a connection setup request queue to increase for a relatively short amount of time. Thus, in one embodiment, the occupancy of a connection setup request queues are weighted to diminish the number of times the corresponding connection setup request rate values are decreased or increased. In one embodiment, the following equation is used to determine whether the occupancy of a connection setup request queue has changed, where $Q_w$ is the weighted queue occupancy for a connection setup request queue, $Q_{now}$ is the current queue occupancy of the connection setup request queue, and $\beta$ is a value between zero and one: $Q_w = (1-\beta)*Q_w + \beta*Q_w$. In one embodiment, $\beta$ is set to 0.8, the current queue occupancy ($Q_{now}$) is used with a weight of 80% to filter out transient burst of requests that lead to connection setup request queue buildup. In the case of sustained loads of requests, the weighted value of $Q_w$ will also increase.

Figure 3:
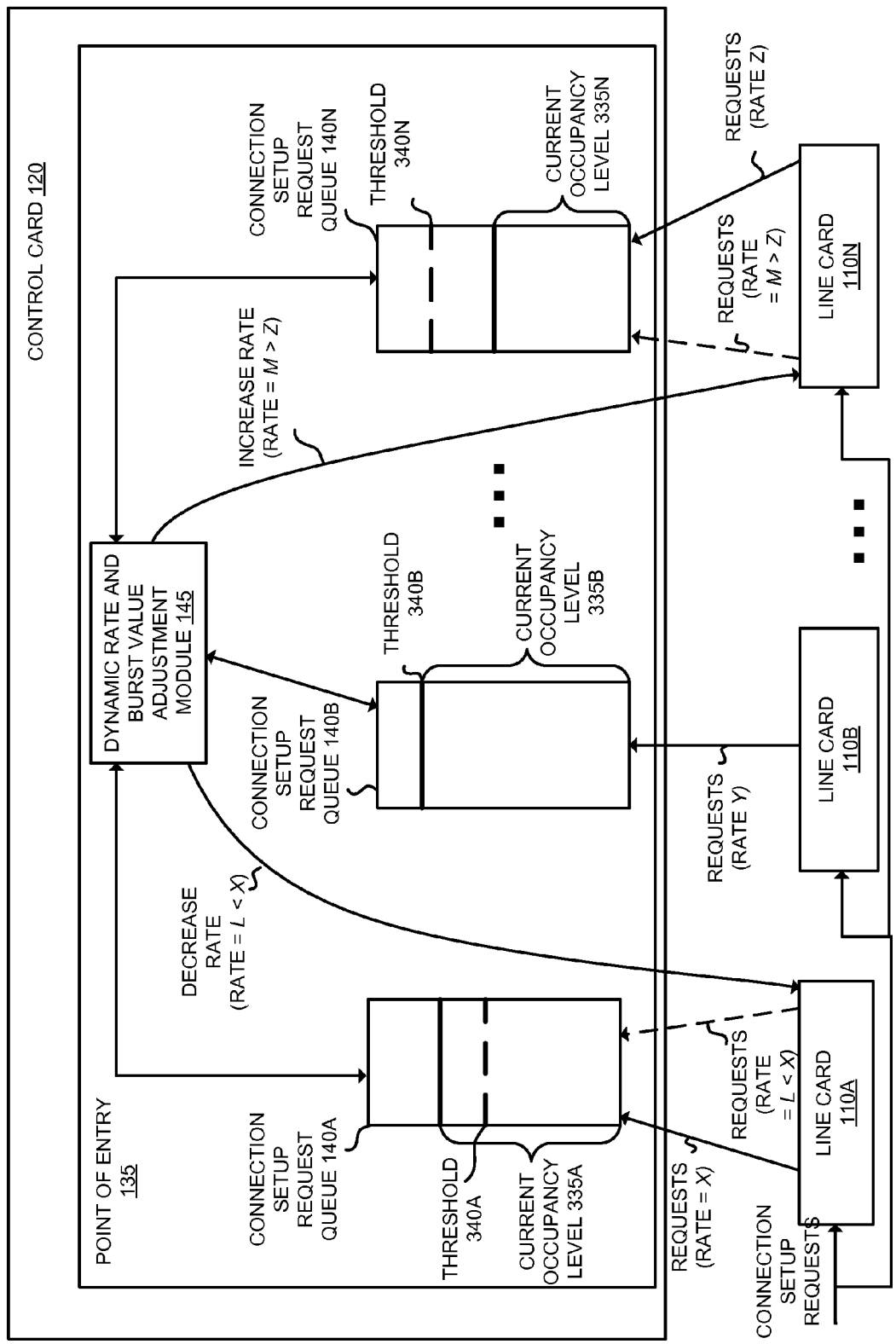
FIG. 3 is a block diagram illustrating adjusting connection setup request rate values in one embodiment of the invention.

FIG. 3 is a block diagram illustrating adjusting connection setup request rate values in one embodiment of the invention. FIG. 3 includes the control card 120 and the linecards 110A-110N. For purposes of explanation, the control card 120 includes one of the point of entries 135 as illustrated in FIG. 1. As illustrated in FIG. 3, the point of entry 135 includes the dynamic rate and burst value adjustment module 145, and the connection setup request queues 140A-140N being associated with the linecards 110A-110N respectively.

Each of the linecards 110A-110N receive connection setup requests that will be directed to the point of entry 135 for further processing. The point of entry 135 enqueues the received connection setup requests. As illustrated in FIG. 3, initially the linecard 110A directs connection setup request to the control card 120 at a rate of X (thus, the connection setup request rate value on the linecard 110A for the protocol corresponding to the point of entry 135 is X). Similarly, the linecard 110B directs connection setup requests to the control card 120 at a rate of Y, and the linecard 1 iON directs connection setup requests to the control card 120 at a rate of Z.

The dynamic rate and burst value adjustment module 145 monitors the occupancy of the connection setup request queues 140A-140N. The connection setup request queues 140A-140N are associated with the threshold occupancy values 340A-340N respectively. For example, the threshold occupancy value 340A is illustrated as a dashed line in the connection setup request queue 140A and the threshold occupancy value 340N is illustrated as a dashed line in the connection setup request queue 140N. The current occupancy of the connection setup request queues 140A-140N are illustrated in the queues as the current occupancy level 335A-335N respectively.

As illustrated in FIG. 3, the current occupancy level 335A of the connection setup request queue 140A is over the occupancy threshold value 340A, the current occupancy level 335B of the connection setup request queue 140B is the same as the occupancy threshold value 340B, and the current occupancy level 335 of the connection setup request queue 140N is below the occupancy threshold value 340N. Therefore, the dynamic rate and burst value adjustment module 145 decreases the connection setup request rate value for the linecard 110A (e.g., decreases the rate from X to L) and increases the connection setup request rate value for the linecard 110N (e.g., increases the rate from Z to M) (the adjusted rates are programmed to the linecards 110A and 110N). Since the occupancy level 335B of the connection setup request queue is at the threshold 340B, the dynamic rate and burst value adjustment module 145 does not adjust the connection setup request rate value of the linecard 110B. Thus, after the adjusted rates are programmed to the linecards 110A and 110N, they will direct the connection setup requests to the control card 120 at the adjusted rates (e.g., rate L and M for the linecards 110A and 110Z respectively).

Thus, the connection setup request rate limit values are dynamically modified without system operator intervention based on the occupancy of the connection setup request queues to more efficiently utilize the processing capabilities and current processing environment of the network element.

Figure 4:
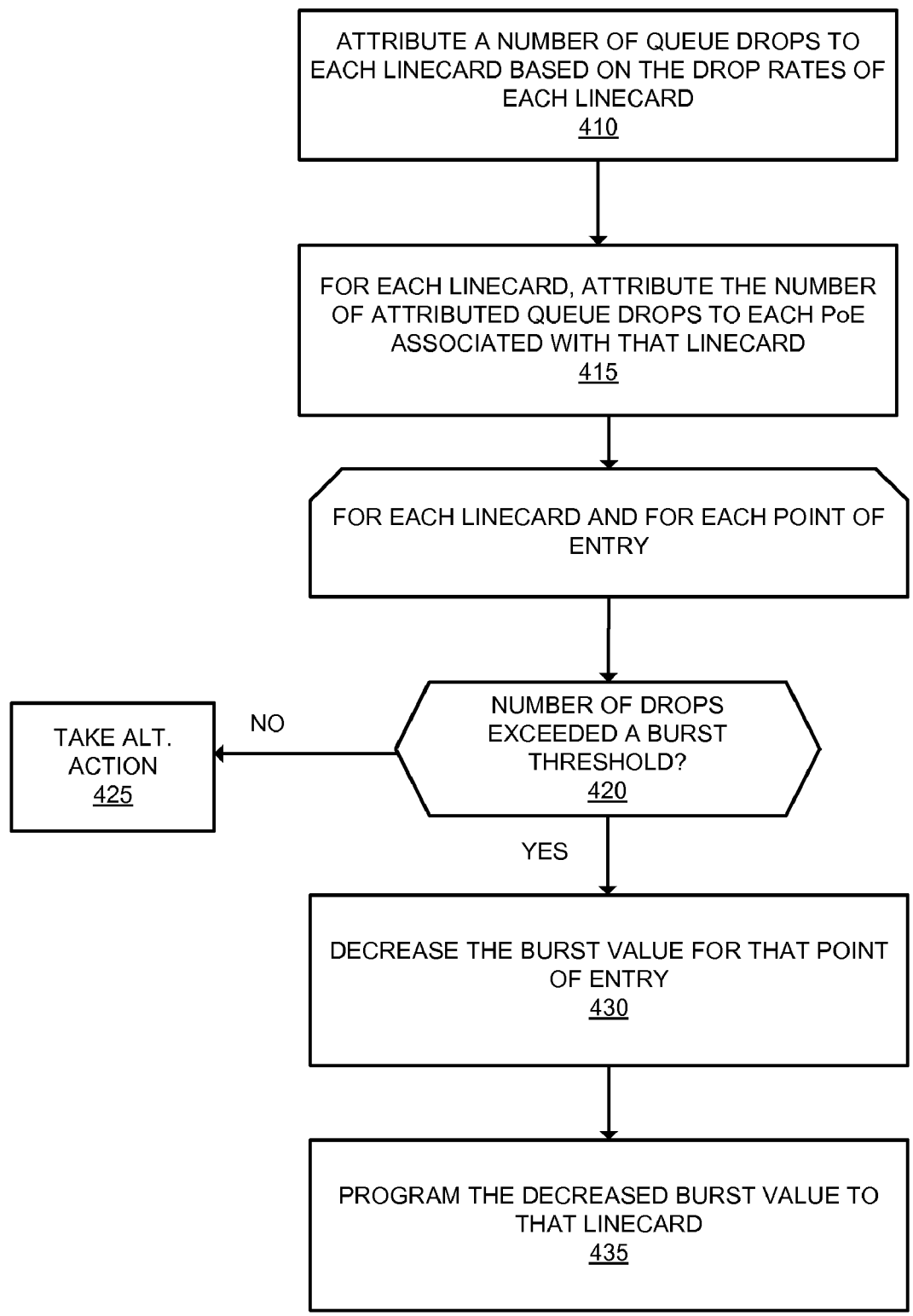
FIG. 4 is a flow diagram illustrating exemplary operations for dynamically adjusting connection setup request burst values in one embodiment of the invention.

In addition to adjusting the connection setup request rate values, the connection setup request burst values are also dynamically adjusted. FIG. 4 is a flow diagram illustrating exemplary operations for dynamically adjusting connection setup request burst values in one embodiment of the invention. The operations of FIG. 4 will be described with reference to the exemplary embodiment of FIG. 1. However, it should be understood that the operations of FIG. 4 can be performed by embodiments other than those discussed with reference to FIG. 1, and the embodiments discussed with reference to FIG. 1 can perform operations different than those discussed with reference to FIG. 4.

FIG. 4 will be described with reference to each point of entry having a separate queue for those linecards it receives packets from. However, embodiments of the invention are not so limited as a single point of entry may have a single queue for multiple linecards it receives packets from.

As described previously, the linecard(s) 110 drop connection setup request packets if the rate of packets being received is greater than the connection setup request admittance parameters (rate limit and burst values) allow. In addition, connection setup request packets may be dropped by the operating system of the control card 120 (e.g., the processor of the control card 120 is overloaded such that it cannot deliver the packets to the request point of entries processing module(s) 170) In one embodiment, the operating system of the control card 120 maintains a count of these number of packets dropped by the operating system, however the drops are not known by the point of entry(ies) 135 (e.g., the point of entry(ies) 135 do not know which linecard the packet is being dropped for).

The number of drops depends on the connection setup request rate values and the connection setup request burst values, however the majority of drops are mostly due to the burst since the connection setup request rate values are dynamically adjusted as described above. However, large connection setup request burst values can cause drops if multiple linecards are sending their maximum burst size at the same time. In one embodiment, the kernel of the network element 100 is modified to maintain statistics about drops per linecard (e.g., associating the drops to a particular linecard).

In an alternative embodiment of the invention, a percentage of the number of queue drops is attributed to each of the linecards based on the current connection setup request burst values on those linecards. For example, the percentage of drops attributed to a particular linecard can be the sum of the burst values of that linecard divided by the sum of the burst values of all linecards (e.g., if the sum of the burst value for a linecard is 10% of the burst values for all linecards, then 10% of the queue drops is attributed to that linecard). If a linecard is receiving and directing connection setup requests to the control card for multiple protocols corresponding to multiple point of entries, the number of drops attributed to each linecard may further be attributed to each point of entry (e.g., the percentage of drops attributed to each point of entry can be the connection setup request burst value for the protocol associated with that point of entry divided by the sum of all the burst values on the linecard).

At block 410, a number of connection setup request queue drops are attributed to each of the linecards based on the connection setup request drop values of each linecard. Flow moves from block 410 to block 415, where for each linecard, the number of connection setup request queue drops attributed to that linecard are further attributed to each point of entry associated with that linecard.

Flow moves from block 415 to block 420. For each linecard and each point of entry associated with that linecard, the operations described in blocks 420-435 are performed. At block 420, a determination is made whether the number of queue drops attributed to that point of entry of that linecard exceeds a burst threshold. If the burst threshold is exceeded, then flow moves to block 430, otherwise flow moves to block 425 where alternative action is taken (e.g., the process ends, no action is taken, etc.). The burst threshold of each point of entry on a particular linecard can be the same or can be different for different point of entries. At block 430, the connection setup request burst value of that point of entry is decreased. Flow then moves to block 435 where the decreased connection setup request burst value is programmed to that linecard.

According to one embodiment, the connection setup request burst values are increased upon a determination to increase the corresponding connection setup request rate values.

Figure 5:
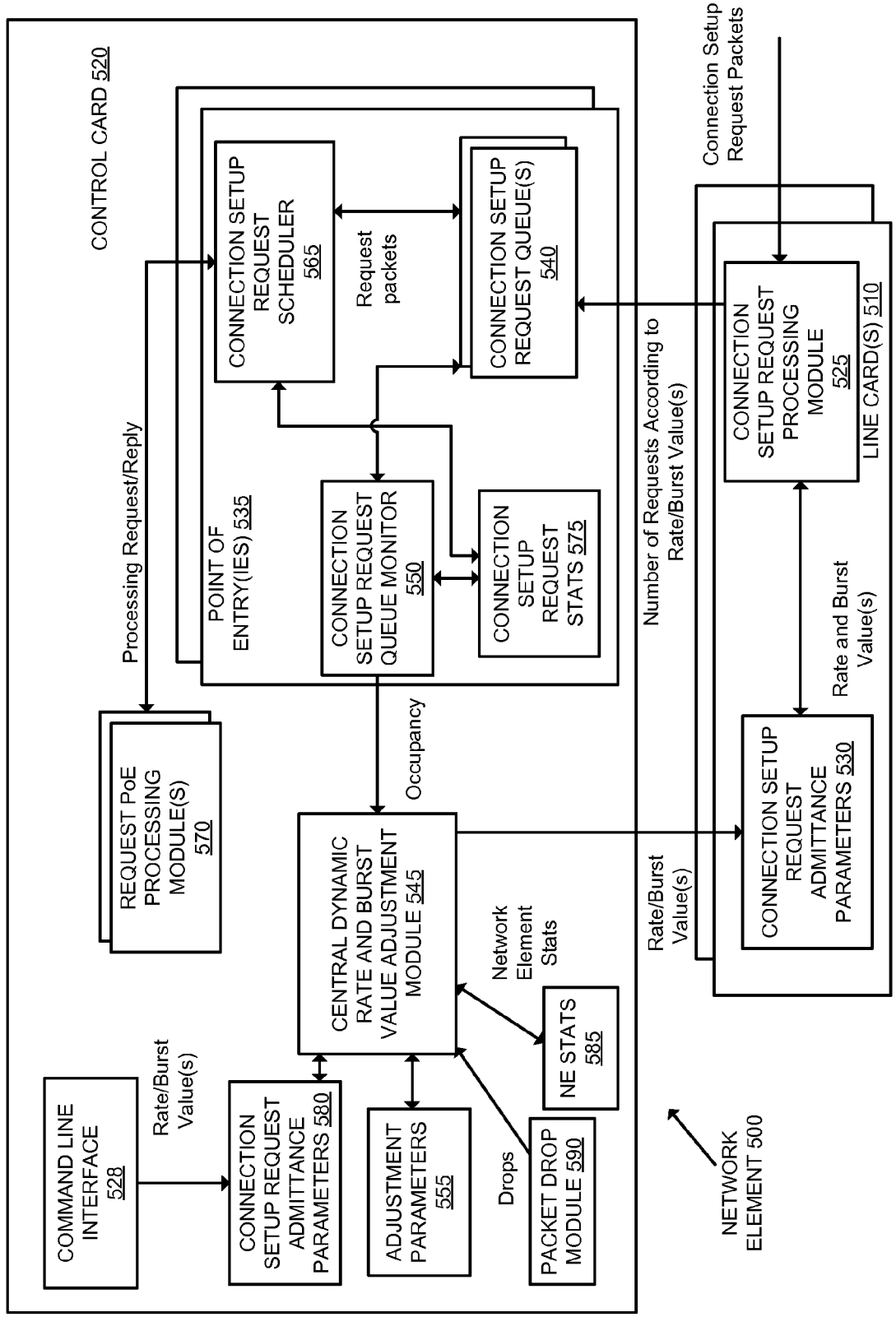
FIG. 5 is a block diagram illustrating an exemplary network element with a centralized dynamic rate and burst value adjustment module to dynamically adjust the number of connection setup request packets accepted for processing according to one embodiment of the invention.

In one embodiment, a centralized dynamic rate and burst value adjustment module is used to dynamically adjust the connection setup request rate and burst values. FIG. 5 is a block diagram illustrating an exemplary network element with a centralized dynamic rate and burst value adjustment module to dynamically adjust the number of connection setup request packets accepted for processing according to one embodiment of the invention.

Similar to the network element 100 of FIG. 1, the network element 500 includes a control card 520 coupled with one or more linecards 510. The control card 520 includes one or more point of entries 535. Each of the point of entries 535 includes one or more connection setup request queues 540 to store connection setup requests to be processed, a connection setup request scheduler 565 coupled with the one or more connection setup request queues 540 to schedule packets for processing (e.g., by the request point of entry processing module(s) 570), a connection setup request queue monitor 550 coupled with the connection setup request queue(s) 540 to monitor the occupancy of those queues, and a connection setup request statistics 575 to store occupancy statistics for the connection setup request queue(s) 540.

Similarly as described with reference to FIG. 1, the linecards 510 each include a connection setup request processing module 525 (which operates similarly as the connection setup request processing module 125 of FIG. 1) and a connection setup request admittance parameters 530 (which is similar to the connection setup request admittance parameters 130).

Similarly as described with reference to FIG. 1, system operators of the network element 500 can use the command line interface 528 to configure the connection setup request admittance parameters (rate and burst values) for each point of entry. The connection setup request admittance parameters are stored in the connection setup request admittance parameters for each of the point of entries 535. In addition, the adjustment parameters (e.g., thresholds) for each of the point of entries 535 are stored in the adjustment parameters 555. In addition, network element statistics (e.g., processor load, etc.) are stored in the network element statistics 585.

The control card 520 further includes the central dynamic rate and burst value adjustment module 545 to dynamically adjust the connection setup request rate and burst values. Unlike the dynamic rate and burst value adjustment module 145 of each point of entry 135 illustrated in FIG. 1, the central dynamic rate and burst value adjustment module 545 further takes as input the network element statistics (e.g., current processor utilization) and the occupancy of each of the connection setup request queues when determining whether to adjust the connection setup request admittance parameters. For example, if one of the linecards is experiencing a failure (e.g., a port flap), the central dynamic rate and burst value adjustment module 545 can prioritize that linecard versus the other linecards (e.g., increase the connection setup request rate and burst values of the failed linecard more than the other linecards, decrease the connection setup request rate and burst values of the linecards not experiencing a failure (in order to further increase the connection setup request admittance parameters of the failed linecard), etc.). As another example, the central dynamic rate and burst value adjustment module 545 can determine to decrease a connection setup request rate or burst value even if the corresponding connection setup request queue is below a threshold if the processor is not currently capable of processing more requests.

Figure 6:
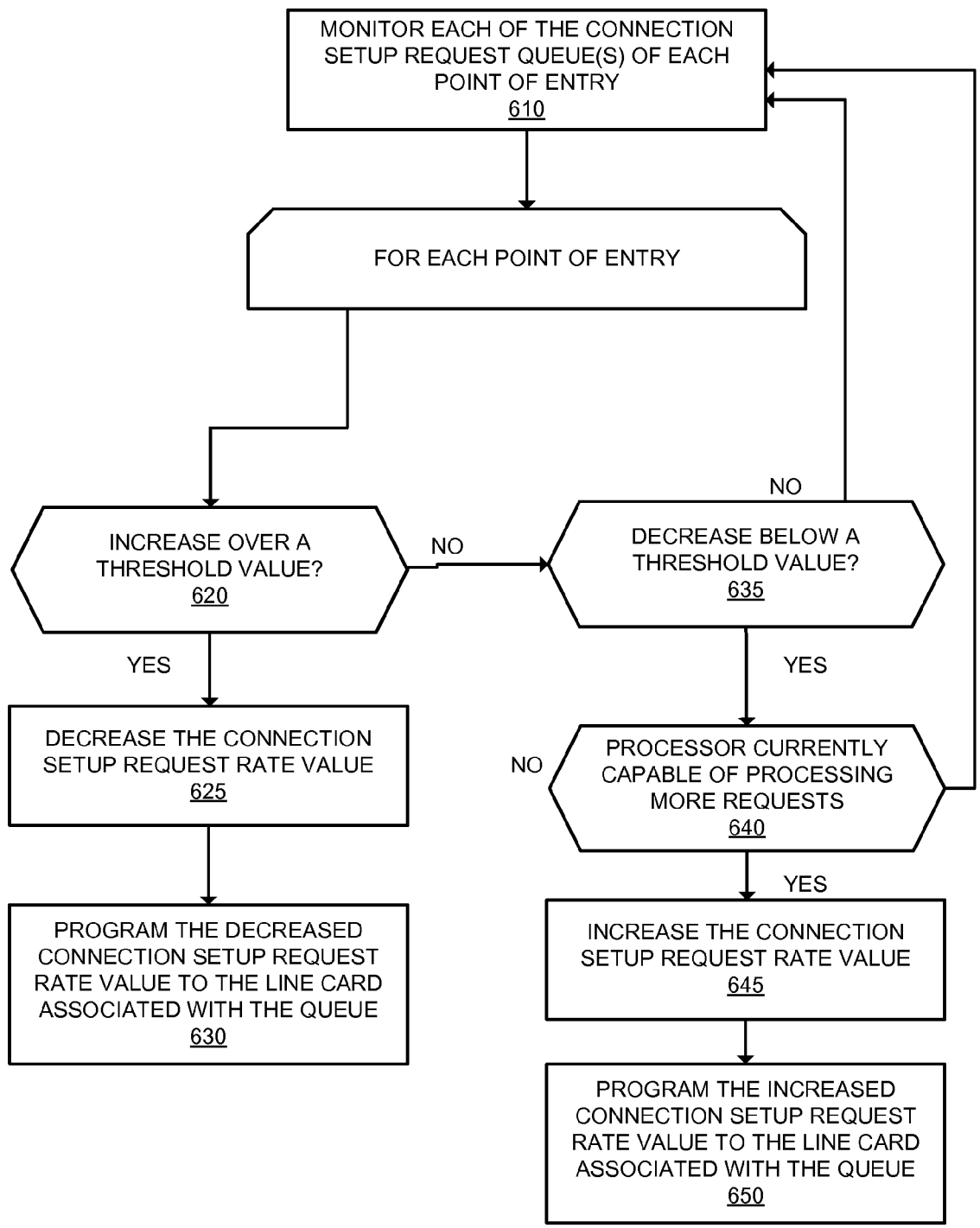
FIG. 6 is a flow diagram illustrating exemplary operations for centrally and dynamically adjusting connection setup request rates according to one embodiment of the invention.

FIG. 6 is a flow diagram illustrating exemplary operations for centrally and dynamically adjusting connection setup request rates according to one embodiment of the invention. The operations of FIG. 6 will be described with reference to the exemplary embodiment of FIG. 5. However, it should be understood that the operations of FIG. 6 can be performed by embodiments other than those discussed with reference to FIG. 5, and the embodiments discussed with reference to FIG. 5 can perform operations different than those discussed with reference to FIG. 6.

At block 610, the occupancy of each of the connection setup request queues 540 is monitored. With reference to FIG. 5, the connection setup request queue monitor 550 monitors the connection setup request queue(s) 540 and provides the current occupancy to the central dynamic rate and burst value adjustment module 545. In another embodiment, the central dynamic rate and burst value adjustment module 545 monitors each of the connection setup request queue(s) 540. Flow moves from block 610 to block 620. For each point of entry 535 and each of the connection setup request queue(s) 540, the operations described in reference to blocks 620-650 are performed.

At block 620, the central dynamic rate and burst value adjustment module 545 determines whether the occupancy for that connection setup request queue has increased over an occupancy threshold value. If the occupancy has increased over a threshold value, then flow moves to block 625, otherwise flow moves to block 635. At block 625, the central dynamic rate and burst value adjustment module 545 decreases the connection setup request rate value for the linecard associated with that connection setup request queue and stores the decreased connection setup request rate value in the connection setup request admittance parameters 580. Flow then moves to block 630, where the decreased connection setup request rate value is programmed to the linecard associated with that connection setup request queue.

At block 635, the central dynamic rate and burst value adjustment module 545 determines whether the occupancy for that connection setup request queue has decreased below an occupancy threshold value. If the occupancy has decreased below the threshold value, then flow moves to block 640 otherwise flow moves back to block 610. At block 640, the central dynamic rate and burst value adjustment module 545 determines whether the processor is currently capable of processing more connection setup requests. For example, based on the network element statistics 585, the central dynamic rate and burst value adjustment module 545 may determine that the processor is not currently capable of processing any more connection setup requests. If the processor is capable of processing more connection setup requests, then flow moves to block 645, otherwise flow moves back to block 610.

At block 645, the central dynamic rate and burst value adjustment module 545 increases the connection setup request rate value for the linecard associated with the connection setup request queue. Flow then moves to block 650 where the increased connection setup request rate value is programmed to the linecard associated with the connection setup request queue.

In one embodiment, the central dynamic rate and burst value adjustment module 545 determines whether to adjust the connection setup request burst values in a similar way as described with reference to FIGS. 1 and 4. For example, the packet drop module 590 collects the number of queue drops experienced by the network element 500. The central dynamic rate and burst value adjustment module 545 attributes each of these queue drops to the linecards and the point of entries. The central dynamic rate and burst value adjustment module 545 further decreases the connection setup request burst values in a similar way as described with reference to FIG. 4. The central dynamic rate and burst value adjustment module 545 increases a connection setup request burst value for a point of entry corresponding to determining to increase a connection setup request rate value for that point of entry.

The embodiments described above describe a mechanism for optimizing the rate at which the connection setup requests are received and enqueued at the point of entries on the control card (e.g., the rate at which the connection setup requests are accepted). In some embodiments, the scheduling of the queued connection setup requests from the different connection setup requests from different point of entries to the processor is optimized to more fully utilize the processor of the control card and reduce latency.

The lifetime of a request in the control card starts when the request is placed into a queue, which is herein referred to as being accepted (e.g., accepted for processing). The request is initiated when the control card begins processing the request, and the request is completed when the processing is completed. The number of requests that have been initiated but not yet completed is referred to herein as the outstanding backlog (e.g., those requests which have been initiated but are still being processed are part of the outstanding backlog).

According to one embodiment, the number of connection setup requests that can be initiated to be processed by the processor at a given time in the control card is dynamically adjusted based on the processor utilization and the latency information from the point of entries. The number of connection setup requests that can be initiated to be processed by the processor in the control card at a given time is referred herein as the "maximum number of initiated requests." It should be understood that the value of the maximum number of initiated requests has numerous effects on the performance of the network element. For example, a maximum number of initiated requests being too low can lead to processor underutilization and a decreased overall request setup rate, while a maximum number of initiated requests being too large can lead to processor overutilization and increased setup latencies. For example, if the value of the maximum number of initiated requests is too large, then the various connection setup request queues will increase which may lead to setup timeouts (e.g., which can also lead to a thrashing condition).

The optimal value of the maximum number of initiated requests depends on the configuration and the mix of the connection setup request types that are active in the network element. For example, as the load of connection setup requests varies (each different type of connection setup request may require a different amount of resources for processing), the amount of connection setup request packets will require a different amount of processing resources. For example, the maximum number of initiated requests may be increased if the new mix of connection setup requests requires few resources and may be decreased if the new mix of connection setup requests requires a relatively high amount of resources. Similarly, the value of the maximum number of initiated requests may need to be changed as a result of a new point of entry being added or an existing point of entry ceasing to be active.

In one embodiment, the maximum number of initiated requests is dynamically modified based on the current processor utilization of the control card and the average latency of the connection setup requests (e.g., the latency including the amount of time the connection setup requests have been initiated through completion). In one embodiment, the maximum number of initiated requests is dynamically increased until the processor is fully utilized.

Figure 7:
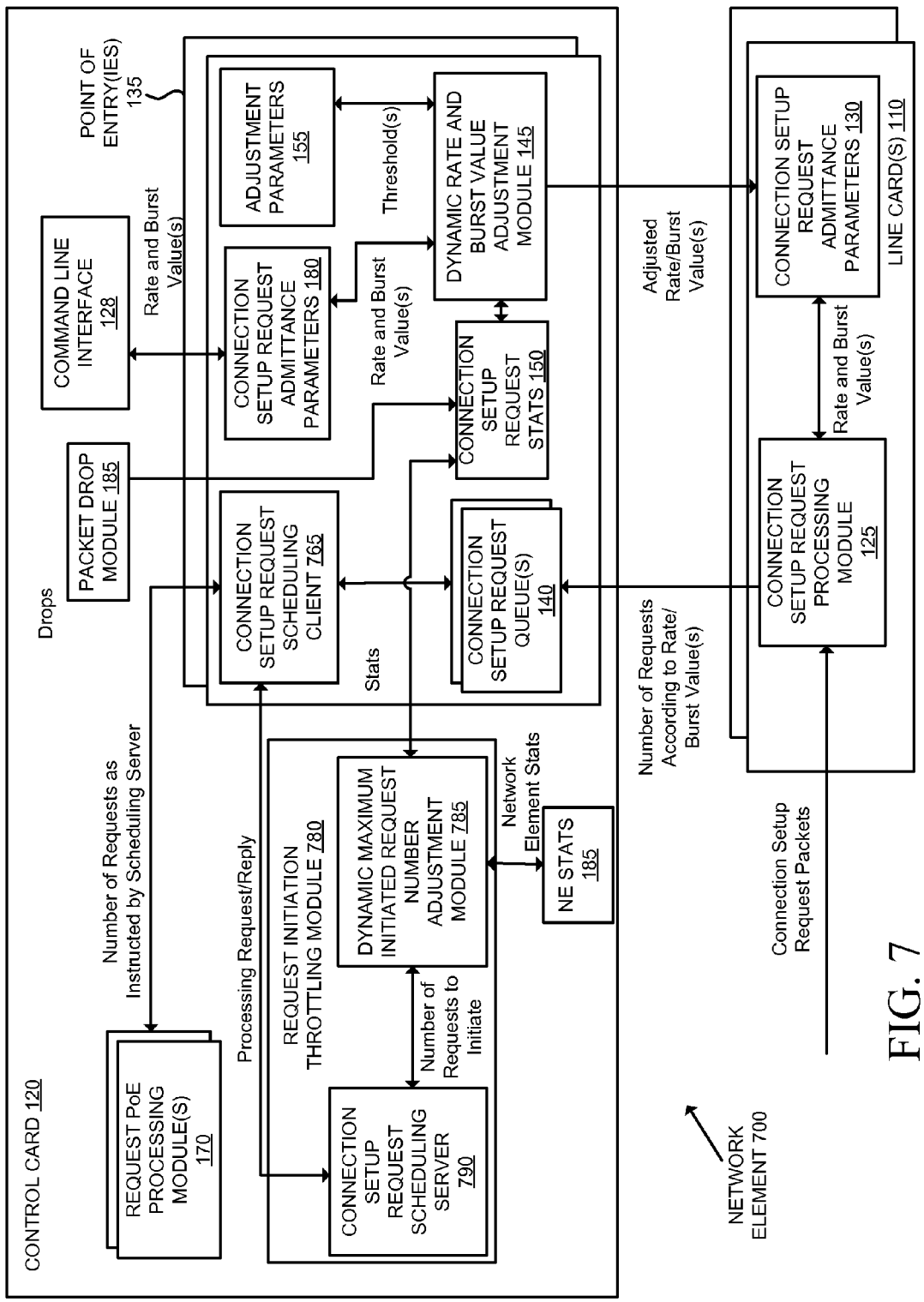
FIG. 7 is a block diagram illustrating an exemplary network element that dynamically adjusts the number of connection setup request packets accepted for processing and dynamically adjusts the maximum number of initiated connection setup requests according to one embodiment of the invention.

FIG. 7 is a block diagram illustrating an exemplary network element that dynamically adjusts the number of connection setup request packets accepted for processing and dynamically adjusts the maximum number of initiated connection setup requests according to one embodiment of the invention. The network element 700 is similar to the network element 100 of in FIG. 1, with the addition of the request initiation throttling module 780 and the connection setup request scheduling client 765 (which replaces the connection setup request scheduler 165). Thus, the network element 700 dynamically adjusts the connection setup request admittance parameters as described above with reference to FIGS. 1-4.

The request initiation throttling module 780 includes the dynamic maximum initiated request number adjustment module 785 to dynamically modify the maximum number of initiated requests and the connection setup request scheduling server 790 to schedule connection setup requests for processing (e.g., determine which of the connection setup requests can be initiated). The dynamic maximum initiated request number adjustment module 785 dynamically modifies the maximum number of initiated requests based on the current processor utilization (provided by the network element statistics 185) and the average latency of the connection setup requests based on the completion time (provided by each one of the one or more point of entries 135). The request initiation throttling module 780 communicates with each of the one or more point of entries 135 through IPC (inter-process communication) or through shared memory.

Each of the one or more point of entries 135 monitors the rate of completion of the requests it has initiated and computes the average completion rate of these requests. The connection setup request scheduling client 765 requests from the connection setup request scheduling server to initiate a number of requests from the connection setup request queue(s) 140. The connection setup request scheduling server 790 replies with a number of requests that are allowed for that point of entry (the number including zero).

Figure 8:
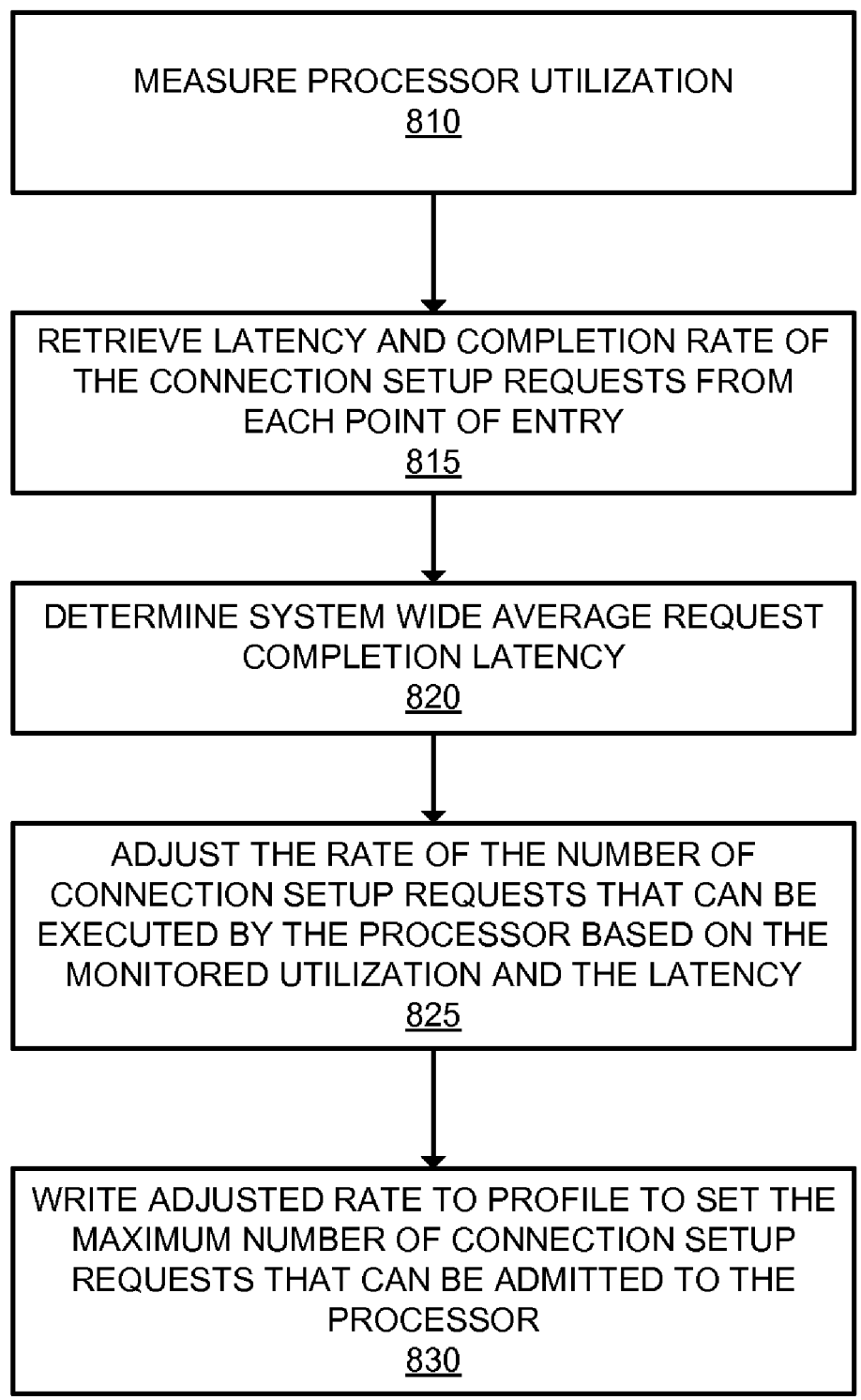
FIG. 8 is a flow diagram illustrating exemplary operations for dynamically adjusting the maximum number of initiated requests according to one embodiment of the invention.

FIG. 8 is a flow diagram illustrating exemplary operations for dynamically adjusting the maximum number of initiated requests according to one embodiment of the invention. The operations of FIG. 8 will be described with reference to the exemplary embodiment of FIG. 7. However, it should be understood that the operations of FIG. 8 can be performed by embodiments other than those discussed with reference to FIG. 7, and the embodiments discussed with reference to FIG. 7 can perform operations different than those discussed with reference to FIG. 8.

At operation 810, the dynamic maximum initiated request number adjustment module 785 measures the current processor utilization (e.g., from the network element statistics 185). Flow moves to block 815, where the dynamic maximum initiated request number adjustment module 785 retrieves from each one of the point of entry(ies) 135 latency and completion rate of the connection setup requests (e.g., the latency and completion rate is retrieved from the connection setup request statistics 150 of each of the one or more point of entries 135). In one embodiment, the dynamic maximum initiated request number adjustment module 785 measures the current processor utilization and retrieves the latency and completion information periodically (e.g., every R number of requests). Flow moves from block 815 to block 820.

At block 820, the dynamic maximum initiated request number adjustment module 785 determines the network element wide average request completion latency based on the latency information retrieved from each of the one or more point of entries 135. Flow moves from block 820 to block 825, where the dynamic maximum initiated request number adjustment module 785 adjusts the maximum number of initiated requests based on the measured processor utilization and the average request completion latency. Flow moves from block 825 to block 830, where the adjusted maximum number of initiated requests is written to a profile that will be used by the connection setup request scheduling server 790 when determining whether to admit a request to the processor.

The connection setup request scheduling server 790 schedules the connection setup requests from the different connection setup request queues to be processed (e.g., to be initiated). It should be understood that connection setup requests from different point of entries (which correspond to different protocols) have different resource requirements and can take a different amount of time to process. Additionally, different connection setup requests from the same point of entry may have different resource requirements. Thus, each connection setup request is not equal. In some embodiments, the connection setup request scheduling server 790 measures the amount of resources needed for each type of request.

The connection setup request scheduling server 790 can use different scheduling policies in different embodiments of the invention to schedule connection setup requests for processing (e.g., a fair setup rate allocation scheduling policy, a fair system resource allocation scheduling policy, and a weighted rate or network element resource allocation scheduling policy).

A fair setup rate allocation scheduling policy treats all point of entries equally over a given number of requests. For example, if there are N point of entries, for each period of R requests, R/N requests from each point of entry are allowed to be initiated. If a new point of entry becomes active or an existing point of entry becomes inactive, the number N point of entries is updated and the R/N requests are recalculated. Since requests from different point of entries can use a different amount of resources and can complete faster/slower than requests from other point of entries, a fair setup rate allocation scheduling policy results in allocating a larger proportion of the resources of the control card to the requests with high resource requirements but requests with smaller resource requirements will not be starved.

A fair system resource allocation scheduling policy ensures that all of the point of entries consume an equivalent amount of the resources of the control card. As described above, in some embodiments the connection setup request scheduling server 790 measures the amount of resources needed for each type of request. For example, during an initialization phase and for each one of the one or more point of entries, the connection setup request scheduling server 790 schedules a number of sample requests for that point of entry (without any other type of requests being active). By observing the completion rate of these sample requests, the connection setup request scheduling server 790 can estimate the amount of resources required to process connections setup requests from that point of entry (e.g., the higher the completion rate the lower the resource requirements). With the approximate amount of resources for each point of entry, the connection setup request scheduling server 790 can assign a relative rate for each point of entry (e.g., the relative rate can be computed as the completion rate of the point of entry divided by the sum of all the completion rates, multiplied by the period of requests). A fair system resource allocation scheduling policy ensures a fair split of resources among the point of entries. If a new point of entry becomes active, the connection setup request scheduling server 790 can observe the completion rate of sample requests for the new point of entry to approximate the amount of resources required by requests for of the type corresponding to the point of entry and can recomputed the relative rates for all of the point of entries. If a point of entry becomes inactive, the relative rates can be recomputed.

A weighted rate or network element resource allocation scheduling policy allows system operators to assign a weight to each of the request types (e.g., each point of entry). The weight may also be set by default to a value which may or may not be configurable. The request type weight can be combined with the fair setup rate allocation scheduling policy described above or the fair network element resource allocation scheduling policy described above. For example, if combined with the fair setup rate allocation scheduling policy, the connection setup request scheduling server 790 can compute the total weight of all of the point of entries and compute the allowed number of requests of that point of entry as the weight assigned to that point of entry divided by the total weight of all of the point of entries, multiplied by the period of requests. As another example, if combined with the fair network element resource allocation scheduling policy, the connection setup request scheduling server 790 can compute the weighted relative weight for each point of entry as the weight assigned to that point of entry divided by the total weight of all the point of entries, multiplied by the relative rate of that point of entry and multiplied by the period of requests.

The connection setup request scheduling server 790 uses the above scheduling policies (or different scheduling policies) to provide differentiated treatment to various request types (e.g., a DHCP connection setup request can be treated differently than a MobileIP connection setup request). If certain request types require preferential treatment (e.g., VoIP sessions require low latency) those request types can be preferred over other less preferential request types by allocating a larger share of system resources to those requests. Yet at the same time, the other connection setup requests in the system will not be starved.

Figure 9:
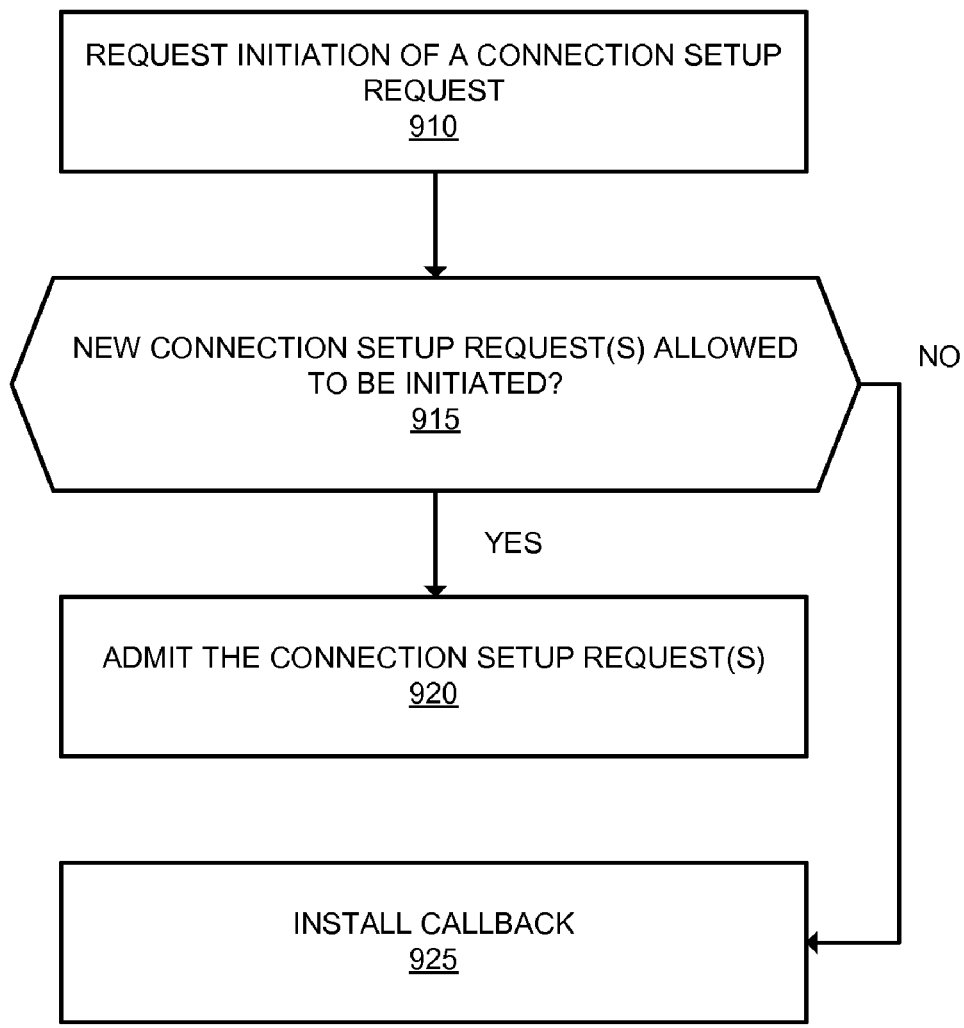
FIG. 9 is a flow diagram illustrating exemplary operations for initiating connection setup requests according to one embodiment of the invention.

FIG. 9 is a flow diagram illustrating exemplary operations for initiating connection setup requests according to one embodiment of the invention. The operations of FIG. 9 will be described with reference to the exemplary embodiment of FIG. 8. However, it should be understood that the operations of FIG. 9 can be performed by embodiments other than those discussed with reference to FIG. 8, and the embodiments discussed with reference to FIG. 8 can perform operations different than those discussed with reference to FIG. 9.

At block 910, the connection setup request scheduling client 765 requests initiation of a set of one or more connection setup requests from one or more of its connection setup queue(s) 140. The request is received by the connection setup request scheduling server 790, which determines the number of connection setup requests that the point of entry can initiate (e.g., based on the scheduling policy and based on the maximum number of initiated requests as provided by the dynamic maximum initiated request number adjustment module 785). Flow moves from block 910 to block 915.

At block 915, the connection setup request scheduling client 765 determines whether new connection setup requests can be initiated (e.g., based on the response from the connection setup request scheduling server 790). If new connection setup request(s) can be initiated, the connection setup request scheduling client 765 admits the connection setup request(s) to the appropriate processing module for further processing (the number of connection setup requests admitted based on the reply from the connection setup request scheduling server 790). If a connection setup request cannot be initiated, the connection setup request scheduling client 765 installs a callback which can be invoked at a later time to initiate the connection setup requests again.

While FIG. 7 has been described with reference to the network element 700 being capable of dynamically adjusting the connection setup request admittance parameters in addition to dynamically adjusting the maximum number of initiated connection setup requests and scheduling the initiated connection setup requests across multiple point of entries, in some embodiments the dynamic adjustment of the maximum number of initiated connection setup request and the scheduling of the initiated connection setup requests from multiple point of entries can be performed separate and apart from the dynamic adjustment of the connection setup request admittance parameters described with reference to FIGS. 1-4. For example, in one embodiment, the connection setup request packets can be accepted into the point of entries by using statically configured rate limit values and statically configured burst values.

Figure 10:
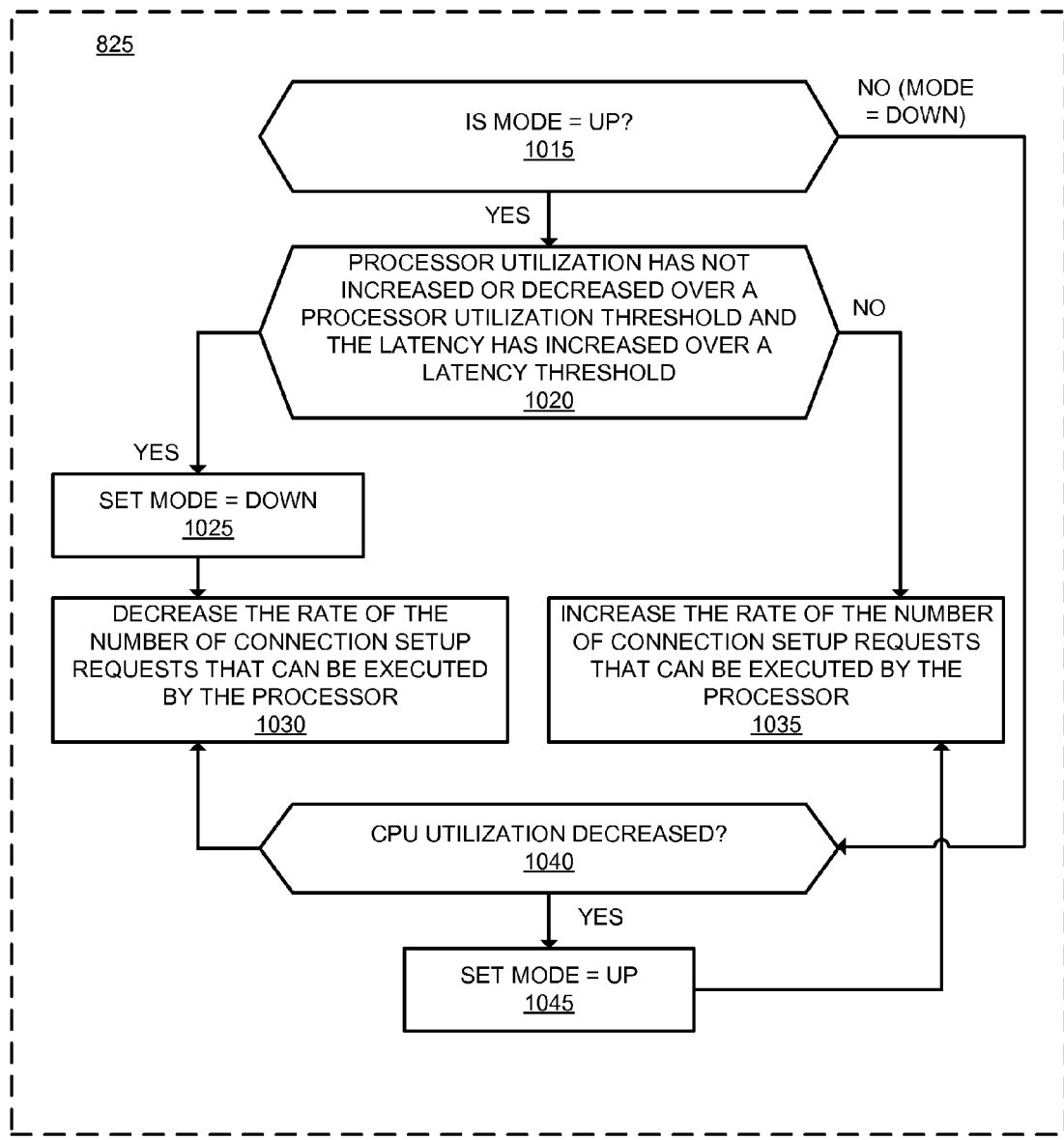
FIG. 10 is flow diagram illustrating exemplary operations for dynamically adjusting the maximum number of initiated requests according to one embodiment of the invention.

FIG. 10 is flow diagram illustrating exemplary operations for dynamically adjusting the maximum number of initiated requests according to one embodiment of the invention. In one embodiment, the operations described in FIG. 10 are performed as part of the operation described in block 825 of FIG. 8.

As described above, periodically the maximum number of initiated requests is dynamically adjusted based on processor utilization and latency information. In one embodiment, the maximum number of initiated requests is progressively increased until latency increases (which is an indication that the connection setup requests are becoming too large such that timeouts may occur), and then progressively decreased until the processor utilization drops. In this manner, the maximum number of initiated requests is dynamically adjusted in an attempt to maintain the processor at full utilization while keeping latencies acceptable.

The mechanism described in FIG. 10 operates either in "Up" mode (where the maximum number of initiated requests is increased) or "Down" mode (where the maximum number of initiated requests is decreased). In one embodiment, the initial mode is Up.

At block 1015, the dynamic maximum initiated request number adjustment module 785 determines whether the mode is Up. If the mode is Up, then flow moves to block 1020, otherwise flow moves to block 1040 (e.g., mode is Down). At block 1020, the dynamic maximum initiated request number adjustment module 785 determines whether processor utilization has not increased or decreased over a processor utilization threshold (e.g., it has stayed approximately the same) and the latency has increased over a latency threshold. If yes, then flow moves to block 1025, otherwise flow moves to block 1035.

At block 1025, the mode is set to Down, and flow moves to block 1030 where the maximum number of initiated requests is decreased. At block 1035, the maximum number of initiated requests is increased. At block 1040 (the mode is Down), the dynamic maximum initiated request number adjustment module 785 determines whether the processor utilization has decreased. If yes, then flow moves to block 1045 where the mode is set as Up and flow moves to block 1035 where the maximum number of initiated requests is increased. If no, then flow moves to block 1030 where the maximum number of initiated requests is decreased.

The amount that the maximum number of initiated requests is increased or decreased can be done differently in different embodiments of the invention (e.g., small incremental increases using an additive increase-additive decrease (AIAD) algorithm, a multiplicative increase-additive decrease (MIAD) algorithm, etc.).

Figure 11:
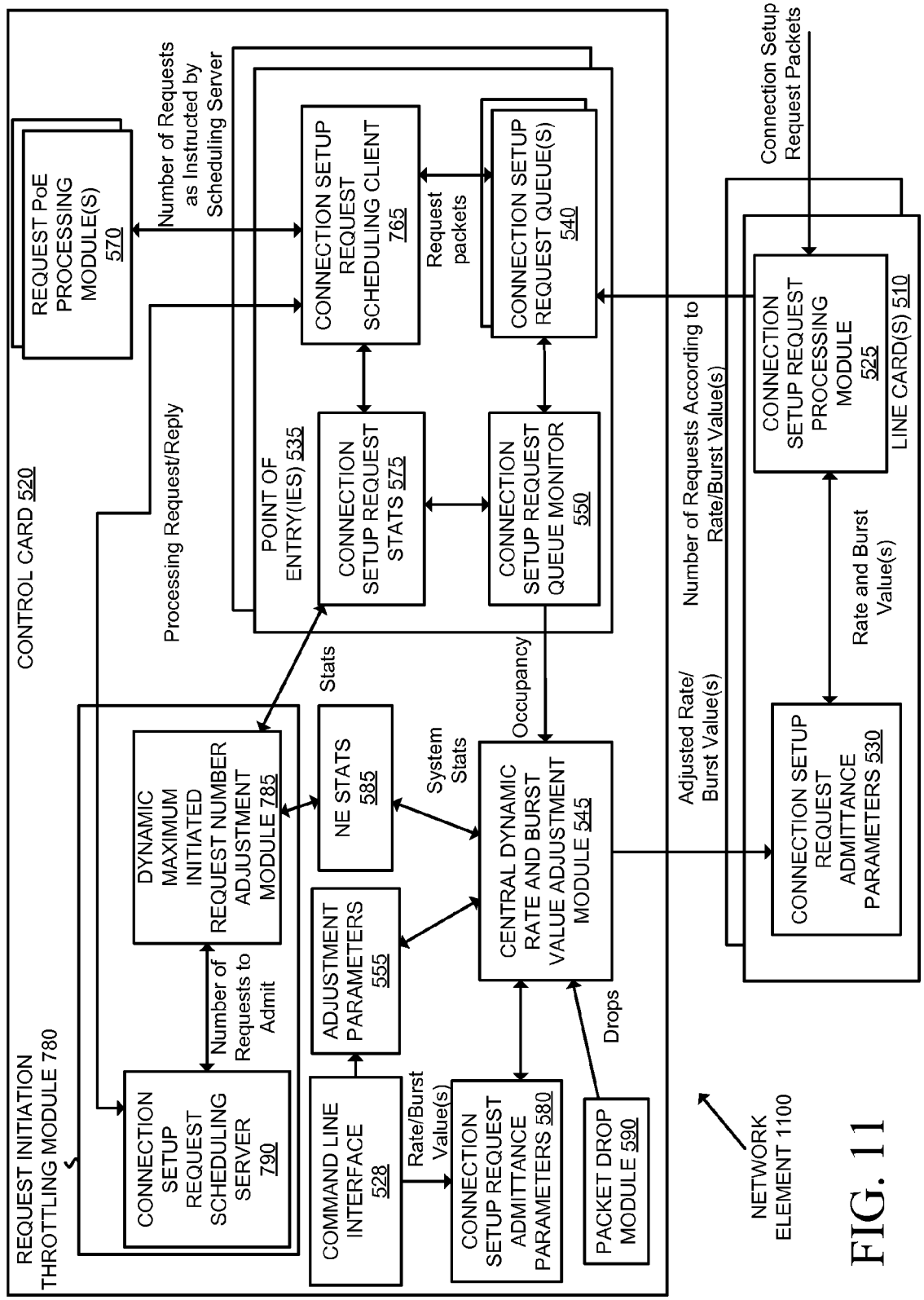
FIG. 11 is a block diagram illustrating an exemplary network element that centrally and dynamically adjusts the number of connection setup request packets accepted for processing, dynamically adjusts the maximum number of initiated connection setup requests, and schedules the initiated connection setup requests across multiple point of entries according to one embodiment of the invention.

In one embodiment, the dynamic adjustment of the maximum number of initiated connection setup requests and the scheduling of initiated requests across the different point of entries is used along with a centralized dynamic rate and burst value adjustment. FIG. 11 is a block diagram illustrating an exemplary network element that centrally and dynamically adjusts the number of connection setup request packets accepted for processing, dynamically adjusts the maximum number of initiated connection setup requests, and schedules the initiated connection setup requests across multiple point of entries.

The network element 1100 operates similarly to the network element 500 of FIG. 5, with the addition of the request initiation throttling module 780 and the connection setup request scheduling client 765 (which replaces the connection setup request scheduler 565). The request initiation throttling module 780 and the connection setup request scheduling client 765 operate in a similar way as described with reference to FIGS. 7-10.

Figure 12:
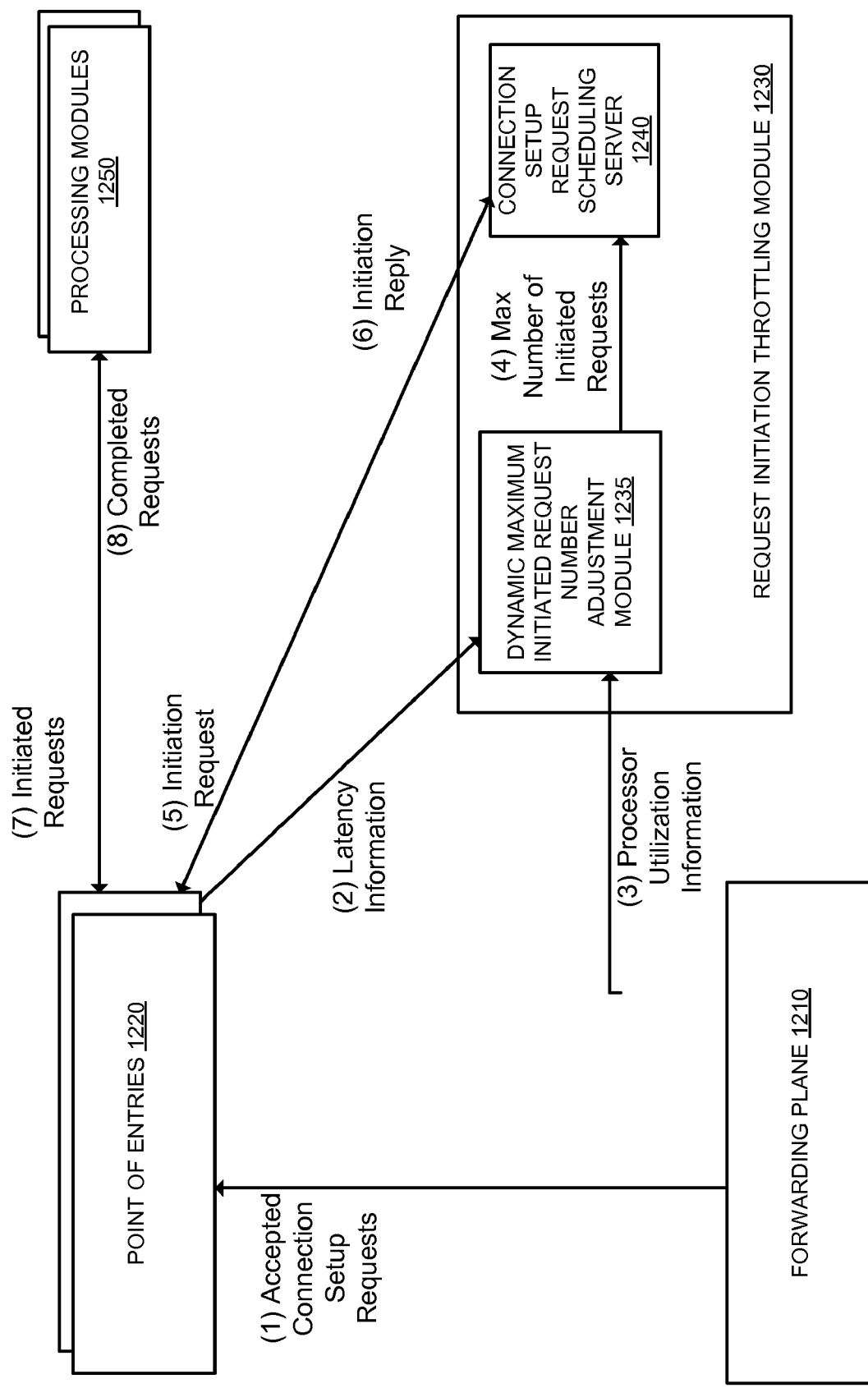
FIG. 12 is a data flow diagram illustrating an exemplary flow of connection setup requests in a network element in accordance with one embodiment of the invention.

FIG. 12 is a data flow diagram illustrating an exemplary flow of connection setup requests in a network element in accordance with one embodiment of the invention. As illustrated in FIG. 12, the forwarding plane 1210 (which includes one or more linecards) is coupled with the point of entries 1220. The point of entries 1220 are coupled with the request throttling module 1230 and the processing modules 1250. The request throttling module 1230 includes the dynamic maximum initiated request number adjustment module 1235 and the connection setup request scheduling server 1240.

At operation 1, the forwarding plane 1210 directs the accepted connection setup requests to the appropriate ones of the point of entries 1220. The point of entries 1220 queues the received connection setup requests. At operation 2, each of the point of entries 1220 provides the dynamic maximum initiated request number adjustment module 1235 with latency information of their requests (e.g., the average time it is currently taking between initiating a connection setup request and a completion of a connection setup request). In one embodiment, the point of entries 1220 provides the latency information responsive to a query by the dynamic maximum initiated request number adjustment module 1235.

At operation 3, the dynamic maximum initiated request number adjustment module 1235 determines the current processor utilization (processor of the control plane (e.g., a control card)). Based on the latency information received in operation 2 and the current processor utilization received in operation 3, the dynamic maximum initiated request number adjustment module 1235 adjusts the maximum number of initiated requests and provides this number to the connection setup request scheduling server 1240 at operation 4.

At operation 5, one of the point of entries 1220 generates a connection setup request initiation request in order to admit one or more connection setup requests to the processing modules 1250. At operation 6, the connection setup request scheduling server 1240 replies to the requesting point of entry with the number of connection setup requests that can be admitted to the processing modules 1250. At operation 7, that point of entry directs the initiated requests to appropriate ones of the processing modules 1250, and at operation 8, the connection setup requests have completed processing.

Thus, since the modification of the maximum number of initiated requests is dynamic and is performed without system operator intervention, the number of requests admitted to the processor automatically adapts to different configurations and different load conditions by determining the proper amount of requests to admit to the processor. Additionally, the modification of the maximum number of initiated requests and the scheduling of requests to processed is done globally and does not rely on localized congestion feedback (relying on localized congestion feedback can lead to wrong throttling decisions (e.g., a temporary congestion in some part of the system does not necessarily mean that the whole system is congested)). Furthermore, the initiation request throttling mechanism described herein considers all of the active request types so that the global performance of the system is optimized and not individual request types.

While embodiments of the invention have been described with reference to a single processor in the control card, it should be understood that embodiments of the invention described herein also apply to a control card with multiple cores.

While embodiments have been described in relation to a linecard having a separate connection setup request queue for each point of entry, it should be understood that in other embodiments of the invention linecards may share a connection setup request queue for each point of entry. In such embodiments where a connection setup request queue includes requests for multiple linecards, the occupancy of that connection setup request queue can be apportioned among those multiple linecards. For example, if one of the linecards is directing connection setup requests to the queue at a high rate and is causing the queue to grow, only the connection setup request rate value for that linecard may be decreased.

While the flow diagrams and the data flow diagram in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for dynamically adjusting a set of one or more connection setup request parameters for a plurality of linecards of a network element, the method comprising:
    monitoring an occupancy of each of a plurality of connection setup request queues, wherein each of the connection setup request queues is associated with one of the plurality of linecards;
    for each connection setup request queue, performing the following:
        dynamically adjusting a connection setup request rate limit value for the linecard associated with that connection setup request queue based on the occupancy of that connection setup request queue, and
        programming that adjusted connection setup request rate limit value to the linecard associated with that connection setup request queue.

2. The method of claim 1, wherein the connection setup request rate limit value for each connection setup request queue is decreased responsive to the occupancy of that connection setup request queue increasing over a threshold.

3. The method of claim 1, wherein the connection setup request rate limit value for each connection setup request queue is increased responsive to the occupancy of that connection setup request queue falling below a threshold.

4. The method of claim 1, wherein for each connection setup request queue, further performing the following:
    dynamically adjusting a connection setup request burst value for the linecard associated with that connection setup request queue based on a number of connection setup request queue drops attributable to that linecard, wherein the connection setup request burst value for the linecard is decreased responsive to determining that the number of connection setup request queue drops attributable to that linecard exceeds a burst threshold.

5. The method of claim 1, wherein the network element processes a plurality of different types of connection setup requests, the method further comprising:
    measuring a current utilization of a processor of the network element;
    calculating an average latency to process each of the different types of connection setup requests; and
    dynamically adjusting a number of connection setup requests that can be initiated to be processed by the processor based on the measured current processor utilization and the calculated latency, wherein the number of connection setup requests that can be initiated to be processed by the processor is dynamically lowered responsive to latency increasing, and wherein the number of connection setup requests that can be initiated to be processed by the processor is dynamically increased responsive to processor utilization decreasing.

6. The method of claim 5, further comprising:
    scheduling connection setup requests from different ones of the connection setup request queues for processing by the processor based on a scheduling policy that treats at least some of the plurality of different types of connection setup requests differently.

7. A method for dynamically adjusting connection setup request rate values for a plurality of linecards of a network element, each linecard including a plurality of connection setup request rate values associated with a plurality of point of entries respectively, the method comprising:
    at each one of the plurality of point of entries, wherein each point of entry includes a set of one or more connection setup request queues of connection setup request packets that need processing by a processor in the network element, wherein each one of the set of connection setup request queues is associated with one of the plurality of linecards, performing the following:
        monitoring an occupancy of each of the set of connection setup request queues,
        for each connection setup request queue whose occupancy currently exceeds a maximum threshold, performing the following:
            decreasing a connection setup request rate value for the linecard associated with that connection setup request queue, and
            programming the decreased connection setup request rate value to the linecard associated with that connection setup request queue, and
        for each connection setup request queue whose occupancy currently is below a minimum threshold, performing the following:
            increasing a connection setup request rate value for the linecard associated with that connection setup request queue, and
            programming the increased connection setup request rate value to the linecard associated with that connection setup request queue.

8. The method of claim 7, wherein the maximum threshold and the minimum threshold are a same value with respect to a same connection setup request queue 9. The method of claim 7, wherein the plurality of point of entries correspond to two or more of DHCP (Dynamic Host Configuration Protocol), PPP (point-to-point), PPPoE (point-to-point over Ethernet), IEEE 802.1q, CLIPS (Clientless IP), VoIP (Voice over IP), Mobile IP, WiMAX, and L2TP (Layer 2 Tunneling Protocol).

10. The method of claim 7, wherein the occupancy of each of the connection setup request queues represents the time required to process the stored connection setup request packets in that connection setup request queue, wherein different ones of the connection setup request are associated with a different maximum and minimum threshold.

11. The method of claim 7, wherein each of the linecards further includes a plurality of connection setup request burst values associated with the plurality of point of entries respectively, the method further comprising:
monitoring a number of connection setup request queue drops;
attributing a portion of the number of connection setup request drops to each point of entry associated with each linecard;
reducing those connection setup request burst values for those point of entries whose attributed portion of the number of connection setup request drops is greater than a burst threshold; and
for each reduced connection setup request burst value, programming that reduced connection setup request burst value to the linecard associated with that point of entry associated with the reduced connection setup request burst value.

12. The method of claim 11, wherein for each connection setup request queue whose occupancy currently is below a minimum threshold, further performing the following:
increasing a connection setup request burst value; and
programming the increased connection setup request burst value to the linecard associated with that connection setup request queue.

13. The method of claim 7, further comprising:
measuring a current utilization of a processor of the network element that is processing the connection setup requests;
calculating latency of each of the point of entries including an average amount of time to complete processing of the connection setup requests; and
dynamically adjusting a number of connection setup requests that can be initiated to be processed by the processor based on the measured current processor utilization and the calculated latency, wherein the number of connection setup requests that can be initiated to be processed by the processor is dynamically lowered responsive to latency increasing, and wherein the number of connection setup requests that can be initiated to be processed by the processor is dynamically increased responsive to processor utilization decreasing.

14. The method of claim 13, further comprising:
scheduling the plurality of connection setup requests from the plurality of point of entries for processing by the processor based on a scheduling policy.

15. The method of claim 14, wherein the scheduling policy is a fair setup rate allocation wherein each point of entry is treated equally.

16. The method of claim 14, wherein each point of entry is further associated with a scheduling weight, wherein the scheduling policy is a weighted rate allocation based on the scheduling weights of each point of entry.

17. A network element, comprising:
a plurality of linecards coupled with a control card, each linecard including a set of one or more connection setup request rate values that have been programmed by the control card, each linecard to perform the following:
receive connection setup request packets, and
process the received connection setup request packets according to the set of connection setup request rate values on that linecard; and
the control card including a plurality of point of entries, each point of entry including a set of one or more connection setup request queues each associated with one of the plurality of linecards, the control card to perform the following:
monitor an occupancy of each of the connection setup request queues,
dynamically adjust connection setup request rate values based on the occupancies of the connection setup request queues, and
program the adjusted connection setup request rate values to the plurality of linecards.

18. The network element of claim 17, wherein the dynamically adjust connection setup request rate values includes the control card to further perform the following:
decrease the connection setup request rate values for those linecards associated with connection setup request queues whose occupancy exceeds a threshold; and
increase the connection setup request rate values for those linecards associated with connection setup request queues whose occupancy drops below a threshold.

19. The network element of claim 17, wherein the control card is further to perform the following:
attribute a number of connection setup request queue drops to each of the linecards;
dynamically decrease connection setup request burst values for those of the linecards whose number of attributed connection setup request queue drops exceeds a burst threshold; and
program the decreased connection setup request burst values to those ones of the linecards.

20. The network element of claim 17, wherein the control card further includes an initiation request throttling module coupled with the point of entries, the initiation request throttling module including,
a dynamic maximum initiated request number adjustment module to dynamically modify the maximum number of initiated requests based on utilization of a processor on the control card and latency of processing initiated requests; and
a connection setup request scheduling server coupled with the dynamic maximum initiated request number adjustment module to schedule connection setup requests of the set of connection setup request queues for each point of entry for processing by the processor based on the maximum number of initiated requests and a scheduling policy.

21. The network element of claim 20, wherein the scheduling policy causes the connection setup request scheduling server to treat at least some of the connection setup request queues differently than other connection setup request queues.

* * * * *

UNITED STATES PATENT AND TRADEMARK OFFICE
CERTIFICATE OF CORRECTION

| | | |
|---|---|---|
| PATENT NO. | : 8,081,569 B2 | Page 1 of 1 |
| APPLICATION NO. | : 12/426637 | |
| DATED | : December 20, 2011 | |
| INVENTOR(S) | : Kourkouzelis et al. | |

It is certified that error appears in the above-identified patent and that said Letters Patent is hereby corrected as shown below:

IN THE SPECIFICATIONS:

In Column 9, Line 7, delete "1 iON" and insert -- 110N --, therefor.

IN THE CLAIMS:

In Column 20, Line 58, in Claim 8, delete "queue" and insert -- queue. --, therefor.

Signed and Sealed this
Twenty-second Day of May, 2012

David J. Kappos
*Director of the United States Patent and Trademark Office*